No. 728,360. PATENTED MAY 19, 1903.
C. F. BREIDENSTEIN.
FISHING SPOON.
APPLICATION FILED JAN. 17, 1902.
NO MODEL.
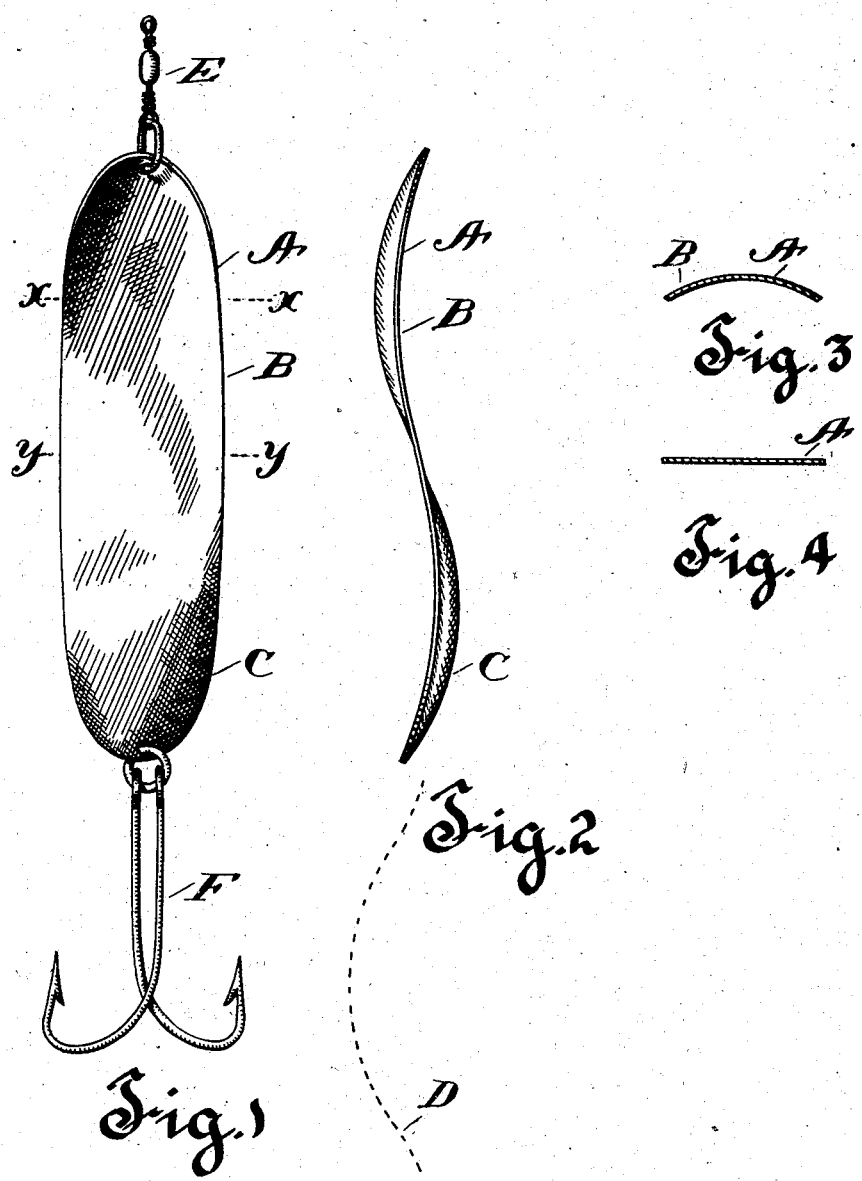

No. 728,360. Patented May 19, 1903.

UNITED STATES PATENT OFFICE.

CHARLES F. BREIDENSTEIN, OF SAN FRANCISCO, CALIFORNIA, ASSIGNOR TO CHARLES H. KEWELL, OF SAN FRANCISCO, CALIFORNIA.

FISHING-SPOON.

SPECIFICATION forming part of Letters Patent No. 728,360, dated May 19, 1903.

Application filed January 17, 1902. Serial No. 90,214. (No model.)

*To all whom it may concern:*

Be it known that I, CHARLES F. BREIDENSTEIN, a citizen of the United States, residing at San Francisco, in the county of San Francisco and State of California, have invented certain new and useful Improvements in Fishing-Spoons; and I do hereby declare the following to be a full, clear, and exact description of the same, such as will enable others skilled in the art to which it appertains to make and use the same.

My present invention relates to fishing or trolling spoons which are bright disks of metal swiveled above hooks and used as a lure or decoy in fishing.

To bring the luring property of the spoon as near the realistic as possible is the prime object of my invention, and this I accomplish by providing a peculiarly-constructed spoon whose snaking motion as it is trolled through the water, added to its property of reflecting rays in many directions, presents the appearance of a rapidly-moving silvery-scaled fish.

As in the majority of trolling-spoons now in general use, I have provided a swivel at one end of the spoon, while from the opposite end are dangled the hooks; but it is evident that this relative arrangement of the hooks is immaterial to the successful operation of the spoon.

I have proved by actual tests the practical value of the spoon and have no doubt but that anglers accustomed to the trolling variety of the sport will readily appreciate how the spoon would act in operation.

I am enabled to accomplish the above results by the means illustrated in the accompanying drawings, in which—

Figure 1 is a front elevation of the complete spoon. Fig. 2 is an elevation taken in a direction at right angles to that shown in Fig. 1. Fig. 3 is a section taken on the line $x\,x$ of Fig. 1. Fig. 4 is a section taken on the line $y\,y$ of Fig. 1.

The spoon is constructed of a thin oblong sheet A of German silver or other suitable metal silver-plated and highly polished and gracefully rounded or curved at both extremities, as shown in Fig. 1. That portion B of the sheet A above the central line $y\,y$ I curve gracefully in one direction, while the lower half C, I curve in the opposite direction, which operation gives to the spoon the outline of an ogee or cymatium. It is evident that by making the curves of these halves more abrupt or more elongated the snaking or wave-like motion in the water will be correspondingly affected. The concaved faces of the spoon are in turn concave transversally to form on the opposite face a convex face or belly, as shown in Figs. 2 and 3 of the drawings.

From the above description it is apparent that as the spoon is trolled through the water in the direction of the arrow in Fig. 2 the path it follows would be wave-like, as represented by the dotted line D, thereby resembling the action of a swimming fish. In order to permit the spoon to turn or revolve occasionally, I have provided the swivel E, while the dangling hooks F capture the lured fish. In this regard I might mention that owing to the many bright curved surfaces utilized in the make-up of the spoon and the fact that their relative positions are ever-changing rays reflected therefrom are most dazzling and effective and give to the spoon a pronounced practical value.

I am aware that changes in the form and proportion of parts of the elements herein shown and described as an embodiment of my invention can be made without departing from the spirit or sacrificing the advantages thereof, and I therefore reserve the right to make such changes and alterations as fairly fall within the scope of my invention.

Having thus fully set forth the construction and operation of my invention, what I claim, and desire to secure by Letters Patent, is—

1. A trolling-spoon formed of a piece of metal free from twist and having its opposite ends dished in opposite directions to assume an essentially ogee form.

2. A trolling-spoon formed of a piece of metal of essentially an ogee form, portions of said spoon being dished in a direction at right angles to the line of said ogee for the purpose set forth.

3. A trolling-spoon having its opposite longitudinal edges in essentially the same curved plane, said plane following essentially an ogee curve.

In testimony whereof I affix my signature in presence of two witnesses.

CHARLES F. BREIDENSTEIN.

Witnesses:
GEORGE PATTISON,
R. C. MAY.